US011968217B2

(12) United States Patent
Buck

(10) Patent No.: US 11,968,217 B2
(45) Date of Patent: *Apr. 23, 2024

(54) DOMAIN NAME AND URL VISUAL VERIFICATION FOR INCREASED SECURITY

(71) Applicant: Lookout, Inc., Boston, MA (US)

(72) Inventor: Brian James Buck, Livermore, CA (US)

(73) Assignee: Lookout, Inc., Boston, MA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/562,420

(22) Filed: Dec. 27, 2021

(65) Prior Publication Data
US 2022/0124101 A1    Apr. 21, 2022

Related U.S. Application Data

(63) Continuation of application No. 16/295,998, filed on Mar. 7, 2019, now Pat. No. 11,240,257.

(51) Int. Cl.
*H04L 9/40* (2022.01)
*H04L 61/4511* (2022.01)

(52) U.S. Cl.
CPC .......... *H04L 63/14* (2013.01); *H04L 61/4511* (2022.05); *H04L 63/0236* (2013.01); *H04L 63/0281* (2013.01)

(58) Field of Classification Search
CPC . H04L 63/14; H04L 63/0236; H04L 63/0281; H04L 63/168; H04L 63/1483; H04L 61/4511
See application file for complete search history.

(56) References Cited

U.S. PATENT DOCUMENTS

| 9,043,894 B1* | 5/2015 | Dennison | H04L 63/1408 |
|---|---|---|---|
| | | | 726/11 |
| 10,679,088 B1 | 6/2020 | Dalal et al. | |
| 11,240,257 B2* | 2/2022 | Buck | H04L 63/0236 |
| 2004/0068542 A1 | 4/2004 | Lalonde et al. | |

(Continued)

FOREIGN PATENT DOCUMENTS

| CN | 110808987 A | * | 2/2020 | .......... H04L 61/1511 |
|---|---|---|---|---|
| CN | 110830607 B | * | 7/2022 | ........... G06K 9/6223 |

(Continued)

*Primary Examiner* — Sarah Su
(74) *Attorney, Agent, or Firm* — Greenberg Traurig

(57) ABSTRACT

Techniques for providing domain name and URL visual verifications to increase security of operations on a device. The techniques include a visual indicator and/or warning to a user on the user's computing device that a domain or URL requested by the user and the device is unpopular, new, unknown, inauthentic, associated with malware or phishing, or in some other way, risky. The techniques include identifying a domain name in a communication received by a computing device and then determining a popularity ranking and/or an age of the domain name. The device can render, for display on a screen of the device, a visual indicator having the popularity ranking and/or the age of the domain name. Also, the techniques can include identifying a URL in a communication received by a computing device and then rendering, for display on a screen of the device, a visual indicator having the entire URL.

24 Claims, 13 Drawing Sheets

(56) References Cited

U.S. PATENT DOCUMENTS

| | | | |
|---|---|---|---|
| 2010/0100957 A1* | 4/2010 | Graham | G06Q 10/107 |
| | | | 726/22 |
| 2013/0198823 A1 | 8/2013 | Hitchcock et al. | |
| 2014/0032589 A1 | 1/2014 | Styler et al. | |
| 2015/0350229 A1 | 12/2015 | Mitchell | |
| 2016/0065535 A1* | 3/2016 | O'Leary | H04L 61/4511 |
| | | | 707/728 |
| 2016/0134651 A1* | 5/2016 | Hu | H04L 63/1416 |
| | | | 726/23 |
| 2016/0352772 A1* | 12/2016 | O'Connor | H04L 63/1483 |
| 2017/0126664 A1 | 5/2017 | Khandelwal et al. | |
| 2017/0195285 A1* | 7/2017 | Kakhki | H04L 61/4511 |
| 2017/0295134 A1* | 10/2017 | Isenberg | H04L 51/48 |
| 2017/0331786 A1* | 11/2017 | Lai | G06F 40/129 |
| 2018/0300475 A1 | 10/2018 | Zhang et al. | |
| 2019/0068624 A1 | 2/2019 | Compton | |
| 2019/0141015 A1* | 5/2019 | Nellen | H04L 63/0272 |
| 2019/0141077 A1* | 5/2019 | Tyler | H04L 63/1483 |
| 2019/0204996 A1 | 7/2019 | Elce et al. | |
| 2019/0222589 A1 | 7/2019 | Kislitsin | |
| 2020/0084219 A1 | 3/2020 | Sung et al. | |
| 2020/0287913 A1 | 9/2020 | Buck | |
| 2020/0296018 A1 | 9/2020 | Pilkington-Lewis et al. | |
| 2020/0374262 A1 | 11/2020 | Hoewisch et al. | |
| 2021/0258325 A1 | 8/2021 | Meyer et al. | |

FOREIGN PATENT DOCUMENTS

| | | | | |
|---|---|---|---|---|
| TW | I740086 B | * | 9/2021 | G06F 16/00 |
| WO | WO-2020135233 A1 | * | 7/2020 | H04L 43/00 |

* cited by examiner

200

```
identifying, by a security application running on a computing device, a domain name in a
communication received by the device
202
```
↓
```
determining, by the security application, a popularity ranking and/or an age of the domain
name
204
```
↓
```
rendering for display on a screen of the device, by the security application, a visual
indicator having the popularity ranking and/or the age of the domain name
206
```

```
receiving a URL in a web browser that is running on a computing device upon a user
entering the URL into the web browser
302
```
↓
```
identifying, by a security application running on the computing device, the received URL
304
```
↓
```
rendering for display on a screen of the device, by the security application, a visual
indicator having the URL entirely
306
```

FIG. 3

DOMAIN NAME AND URL VISUAL VERIFICATION FOR INCREASED SECURITY

RELATED APPLICATION

The present application claims priority to U.S. patent application Ser. No. 16/295,998, filed Mar. 7, 2019 and entitled "DOMAIN NAME AND URL VISUAL VERIFICATION FOR INCREASED SECURITY," the entire disclosure of which is hereby incorporated herein by reference.

FIELD OF THE TECHNOLOGY

At least some embodiments disclosed herein relate to domain name and uniform resource locator (URL) visual verifications on displays of computer systems.

BACKGROUND

In general, phishing includes fraudulent attempts to obtain sensitive information such as usernames, passwords and credit card details by disguising as a trustworthy entity in an electronic communication. In some cases, the disguise can be a website or a downloadable application. In some other cases, for example, phishing can be carried out by email spoofing or instant messaging, which often directs users to enter personal or sensitive information at a fake website or into a fake application. The fakes, which are often clones of authentic websites or applications, can have the look and feel of which are identical to the real thing.

Often domains, URLs, and domain names of phishing websites and applications are crafted to deceive users by looking like authentic domains, URLs, and domain names. It is very easy for a user to type in a URL or domain name for a phisher when the user makes a typographical error. And, known user interfaces and browsers provide very little with respect to visual indication of such a mistake.

Also, links provided in user interfaces are often truncated or do not allow users to inspect complete domain names or URLs. The lack of complete visibility makes it hard for even a conscientious user to be aware and cautious about clicking on a link. A solution to improve visibility of a complete domain name or URL in a link, so that users can exercise care and judgment about the link, is not known in the field.

SUMMARY OF THE DESCRIPTION

Techniques for providing domain name and URL visual verifications on displays of computer systems are described herein.

The techniques disclosed herein for providing domain name and URL visual verifications provide specific technical solutions to at least overcome the technical problems mentioned in the background section and other parts of the application as well as other technical problems not described herein but recognized by those skilled in the art.

The techniques described herein can include a visual indicator and/or warning to a user on the user's computing device that a domain or URL requested by the user and the device is unpopular, new, unknown, inauthentic, associated with malware or phishing, or in some other way, risky.

In some embodiments, the techniques can include identifying a domain name in a communication received by a computing device and then determining popularity ranking and/or an age of the domain name. Then, the computing device can render, for display on a screen of the device, a visual indicator having the popularity ranking and/or the age of the domain name. The popularity ranking of the domain can represent a volume of requests associated with the domain name.

In some embodiments, the techniques can include identifying a URL in a communication received by a computing device and then rendering, for display on a screen of the device, a visual indicator having the entire URL.

In some embodiments, the techniques can include identifying, by a security application running on a computing device, a domain name in a communication received by the device. The techniques can also include determining, by the security application, whether the domain name is to be further evaluated. The determination can include determining a popularity ranking and/or an age of the domain name. The determination can also include determining whether the popularity ranking is below a popularity threshold and/or the age is below an age threshold, and determining that the domain name is to be further evaluated when the popularity ranking is below a popularity threshold and/or the age is below an age threshold. For example, the popularity threshold can include a minimum popularity ranking threshold value such as one thousand. Thus, in such an example, if it is determined that the popularity ranking of the domain is less than one thousand, then it can be determined that the domain name is to be further evaluated. Also, for example, the age threshold can include a minimum age threshold value such as one year. Thus, in such an example, if it is determined that the age of the domain is less than one year, then it can be determined that the domain name is to be further evaluated.

The techniques can also include rendering, for display on a screen of the device, a visual indicator that the domain name is to be further evaluated, when it is determined that the domain name is to be further evaluated.

Also, in such embodiments, the techniques can include sending by the security application, over a network, the domain name to one or more computing devices for further evaluation of the domain name by the one or more computing devices. The security application can then receive, over the network, a further evaluation of the domain name from the one or more computing devices. The security application can also determine whether the domain name is to be blocked, accepted, or further evaluated, based on the received further evaluation of the domain name from the one or more computing devices. Then, it can also render, for display on the screen, a second visual indicator that the domain name is blocked, accepted, or undergoing further evaluation.

This disclosure includes various systems and devices that can perform the above methods as well as other methods described herein, which includes a non-transitory computer readable medium having instructions which when executed by a processor on a data processing system can cause the processor and/or the system to perform any one of the methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 2 shows an example method 200 for domain name and URL visual verifications including rendering a visual indicator having a popularity ranking and/or an age of a domain name, according to some embodiments.

FIG. 3 shows an example method 300 for domain name and URL visual verifications including rendering a visual indicator having an entire URL entered by a user, according to some embodiments.

DETAILED DESCRIPTION

Figure 1:
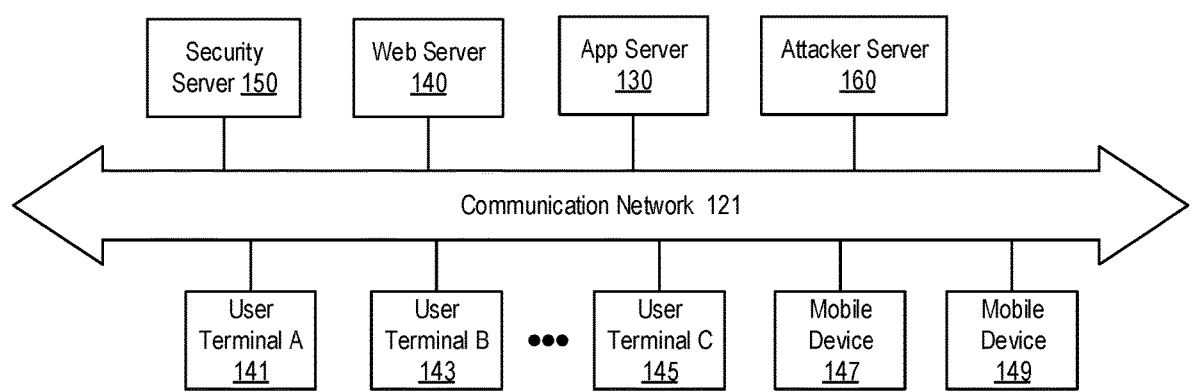
FIG. 1 shows a system for performing domain name and URL visual verifications on displays of computer systems, according to some embodiments.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in some embodiments" in various places in the specification are not necessarily all referring to the same embodiments, nor are separate or alternative embodiments mutually exclusive of other embodiments. Moreover, various features are described which may be exhibited by some embodiments and not by others. Similarly, various requirements are described which may be requirements for some embodiments but not other embodiments.

Techniques for providing domain name and URL visual verifications on displays of computer systems are described herein. The technical problems mentioned in the background section and other problems described herein as well as problems not mentioned herein related to deceptive domain names and URLs can be remedied with the techniques.

Often domains, URLs, and domain names of phishing websites and applications are crafted to deceive users by looking like authentic domains, URLs, and domain names. It is very easy for a user to type in a URL or domain name for a phisher when the user makes a typographical error. And, known user interfaces and browsers provide very little with respect to visual indication of such a mistake.

One example solution is to display a visual indicator to a user if a domain is not popular or is too new. An inauthentic domain will likely be much less popular, and far younger in terms of when domain was registered or had ownership recently transferred due to domain expiration. Thus, the techniques disclosed herein can determine a popularity and/or an age of a domain, and provide a user a visual indication of those facts. Also, the techniques disclosed herein can provide a visual indication if popularity is below a threshold, and/or if an age of a domain is younger than a threshold.

Popularity of a domain can be determined using services like the ALEXA.COM site info service (see aws.amazon.com/alexa-top-sites/). Such services can provide a cost per a certain number of URLs, such as $0.25 per 100 URLs. In some embodiments, popularity of a domain can be determined by telemetry from the security application which can record instances of the domain being used or visited, thereby computing a popularity of the domain.

Age of a domain can be determined using a third-party service (such as by using WHOIS). Age of a domain or domain name can also be determined proactively by having consumed at a server any of several data feeds that contain information on new domain registrations or domain ownership changes. Domain ownership changes can be useful information because an attacker can leverage the reputation of a pre-existing domain that it has purchased.

Rankings and/or ages of domains can be done a domain name basis, and not a URL basis. In such examples, evaluation of a domain can be done using a DNS extension or resolution point, or in a transparent proxy. Even if there is a TLS connection, a security application can get to see the domain in the TLS handshake if positioned as a transparent proxy. The popularity ranking of the domain can represent a volume of requests associated with the domain name.

Example: a hypothetical third-party lookup on an authentic website such as www.authentic_site.com can result in a specific URL, such as: https://www.third_party_service.com/siteinfo/www.authentic_site.com?offset=1&version=3rdp_20178, which shows the service's popularity rank of the site as Rank 125.

A hypothetical third-party lookup on an inauthentic website such as www.aattentic_site.com can result in a specific URL, such as: https://www.third_party_service.com/siteinfo/www.aattentic_site.com?offset=2&version=3rdp_101111, which shows that the service has no popularity rank of the inauthentic website.

A user going to the authentic website can proceed, perhaps with no visual display of domain metadata. On the other hand, a user going to the inauthentic website, because there is no data, or if the data showed info below or above certain thresholds depending on the embodiment, can receive a visual warning through the display of the user's device, such that the warning indicates that the website is not popular or is an old website.

Another example: a hypothetical third-party lookup on an inauthentic website such as www.suthentic_site.com can result in a specific URL, such as: https://www.third_party_service.com/siteinfo/www.suthentic_site.com?offset=2&version=3rdp_22213, which shows that the service has a popularity rank of 17,995 for the inauthentic website.

A user going to the authentic website can proceed, perhaps with no visual display of domain metadata. On the other hand, a user going to the inauthentic website in the second example, because the rank is below a threshold, the user can receive a visual warning through the display of the user's device, such that the warning indicates that the website is not popular.

In some embodiments, the domain can be compared to domains in the user's and/or device's browsing history, and in absence of a match, a warning can be provided such as "you have not been here before". Also, similarity of a domain to an authentic domain can be an indicator of possible deception; upon detecting such possible deception a visual indicator of such deception can be displayed, e.g., "this domain DOMAINBEINGVISITED is similar to a domain you have previously visited, DOMAINPREVIOUSLYVISITED, and may be an attempt to deceive you for malicious purposes. And, the visual indicator can include a text notification, an image (e.g., sparkline), or an animation.

Additionally, links provided in user interfaces are often truncated or do not allow users to inspect complete domain names or URLs. The lack of complete visibility makes it hard for even a conscientious user to be aware and cautious about clicking on a link. A solution to improve visibility of a complete domain name or URL in a link, so that users can exercise care and judgment about the link, is not known in the field. For example, a problem that can occur is in the lack of complete visibility on a screen of a URL that makes it hard for even a conscientious user to be aware and cautious about clicking on a link to an inauthentic URL. This is particularly a problem in mobile browsers, where display space limitations often mean that only a portion of the domain or URL is visible. Providing visibility of the inauthentic URL before a user navigates to the website of the URL can be useful in avoiding an attacker. In some embodiments, a user interacting with a URL/link displayed on a computing device screen can cause then entire URL to appear. Also, a warning before a user is allowed to proceed to the URL can be provided with a complete visual presentation of the URL. For example, when a user clicks on a link, the device can display a message to the user showing the complete URL and/or domain, and ask for permission to continue or not with navigation to the URL and/or domain.

In some embodiments, the presentation of a message to a user is not performed when the domain and/or URL has been assessed as benign. Following the link is allowed by the device without a warning to the user. In some embodiments, the presentation of a message to a user is not performed when the domain and/or URL has been assessed as phishing or potentially harmful. In such example, the link is denied by the device. Also, a presentation of the warning message with the full domain/URL can be provided to a user when the domain/URL has not been assessed sufficiently, or if it has been assessed as suspicious but not specifically confirmed as phishing or potentially harmful.

In some embodiments, a security application can render for display a visual indicator if the domain or URL is not popular or is too new. An inauthentic domain may likely be much less popular, and far younger in terms of when domain was registered or had ownership recently transferred—such as due to domain expiration. The application can retrieve or determine popularity and/or the age of the domain, and provide to the user a visual indication of those facts. In some cases, the security application only provides the visual indication if the popularity is below a popularity threshold, and/or if the age of the domain is younger than an age threshold. Popularity of a domain can be determined using third party services, or via prior records of a domain's usage from telemetry from the security application, or by comparison of the domain to domains visited by the user or domains in the current user's bookmarks or in the bookmarks of other users on other devices. Age of a domain can be determined or retrieved via third-party services as well or proactively by having consumed at a server any of several data feeds which contain information on new domain registrations or domain ownership changes. Evaluation of a domain based on ownership changes is useful because an attacker can and do often leverage the reputation of a pre-existing domain.

In some embodiments, because the evaluation and eventual warning is based on domain names, the security application can be run a DNS extension or resolution point, or in a transparent proxy. Even in cases of a TLS connection, the security application can successfully perform the evaluation and warning since domains can be retrieved from a TLS handshake.

Another problem that can occur is in the lack of complete visibility of a URL on a screen. This problem can be remedied by the security application in that in some examples it can provide visibility of the complete URL entered or request by a user. This can help in preventing accidental navigation to a phisher or another type of attacker.

In some embodiments, the techniques described herein can include a visual indicator and/or warning to a user on the user's computing device that a domain or URL requested by the user and the device is inauthentic, associated with malware or phishing, unpopular, new, unknown, or in some other way, risky. The generation and rendering of the indicator or warning can be performed by a security application running on the computing device of the user or another one or more computing devices connect to the computing device of the user.

The visual indicator or warning can be a notice to a user that the security application is not aware of the safeness of the identified domain or URL. A domain or URL that is already known to be safe can be ignored or immediately accepted by the security application so that a browser can navigate to or use a corresponding website or application without visual interruption from the security application. On the other hand, a domain or URL that is already known as unsafe can be blocked or some other security action can be performed without visual interruption from the security application. The display of the visual indicator or warning is meant to be intrusive to the user experience only when the safeness of a domain or URL is unknown or in some sort of gray area. The visual indicator provides a mechanism for further evaluation of the safeness by the user, and provides a meaningful delay in the user experience that allows for background processes to evaluate the domain or URL as well.

In some embodiments, the security application can communicate with data processing computers in a cloud to assess the safeness of the domain or URL while the visual indicator or warning is being rendered and displayed for the user. The time it takes for the user to read the warning could be enough time for the system in the cloud to evaluate the domain or URL and provide a more certain answer. The more certain answer could interrupt or immediately follow the initial visual indicator or warning. For example, the more certain answer could say something like "never mind, the domain is safe or meets the safety threshold, and your device is proceeding to the domain" or "never mind, the domain has been determined as unsafe or does not meet the safety threshold, and the domain is blocked". Or, the more certain answer can be that further evaluation is needed in addition to the initial evaluation of the domain or URL.

FIG. 1 shows a system for performing domain name and URL visual verifications on displays of computer systems including an application server 130, web server 140, security server 150, a user terminal (e.g., one of terminals 141, 143, 145), and/or a mobile device (e.g., one of mobile devices 147 or 149), according to some embodiments. In FIG. 1, the user terminals 141, 143, and 145 and/or mobile devices 147 and 149 are used to access and/or communicate with application server 130, application server 140 and security server 150 over a communication network 121 (e.g., the Internet, a wide area network, a local network, or other wired or wireless communications network).

Network 121 can be used to download and remotely install applications selected from the application server 130. The application server 130 can be part of a marketplace (e.g., using Google Play or the Android Market). Marketplace can include one or more web servers (or other types of data communication servers) to communicate with the user terminals (e.g., 141, 143, . . . , 145) and mobile devices 147, 149. Also, network 121 can be used to access websites or web applications such as from the web server 140.

The attacker server 160 represents an example of an attacker, such as a phishing attacker, that can use inauthentic domains and/or URLs to be mistaken for authentic domains and/or URLs by users. The attacker can also use a cloning toolkit to clone or at least attempt to clone one or more websites served from the web server 140 and/or one or more downloadable applications served from the application server 130. These clones can then be served to the user when the user attempts to access the corresponding authentic properties from corresponding inauthentic domains and/or URLs by accident.

Mobile devices can include, for example cell phones, smartphones, and tablet devices such as the iPhone device or an Android tablet. Mobile devices can also include automobiles, planes, or other vehicles that include a computing device, such as an embedded computing or communication system that communicates via the Internet over a cellular phone system, or other portable computing devices (e.g., devices that pair with a mobile device using Bluetooth, such as an Apple watch). For the purposes of this disclosure, mobile devices can also include voice-controlled virtual assistants, in separate appliances or operating as applications on other devices; in such cases, there may be no visibility of domains or URLs, and the "visual indicator" can be replaced or augmented by using an audible indicator. The mobile devices communicate with the servers, websites and application marketplaces.

Additional examples of mobile devices include devices that are part of what is called "the internet of things" (IOT). In the IOT there are multiple devices which operate without accompanying and attendant users. Such devices can be mobile or sessile; they can have various sensors and computing and communication capabilities and can run applications; schematically they can be considered substantially similar to a mobile device. Such "things" can have occasional interactions with owners or administrators of the "things", who can monitor the things or modify settings on these things. Such owners or administrators play the role of users with respect to the "thing" devices. In some examples, the primary mobile device of a user can be an administrator server with respect to a paired "thing" device that is worn by the user (e.g., an Apple watch). In an embodiment, a "thing" or a device, e.g., one intended for use as a health or medical device, can have an embedded white list defining trusted sources for applications, or can have an administrator associated with that device.

Operations of the methods 200, 300, 400, 500, 600, 700, 800, and 900 can be performed by any one of the various systems described herein, which includes a non-transitory computer readable medium having instructions which when executed by a processor on a data processing system can cause the processor and/or the system to perform any one of the operations. For example, some operations of the methods can be performed by the computing device 1001 illustrated in FIG. 10. Also, for example, some operations of the methods can be performed by one of the user terminals or mobile devices illustrated in FIG. 1 and/or the computing device 1101 illustrated in FIG. 11.

The operations of the methods can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

Although shown in a particular sequence or order, unless otherwise specified, the order of the operations of the methods described herein can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other process flows are possible.

FIG. 2 shows an example method 200 for domain name and URL visual verifications including rendering a visual indicator having a popularity ranking and/or an age of a domain name, according to some embodiments. A security application, such as any of the security applications described herein, can be a stand-alone application installed on a computing device, an extension or plugin application running in a web browser, a component of a web browser, and/or a component of an operating system of a computing device. The security application or another component can render a visual indicator within the display of a website, as a popup warning, in a separate area of the browser display, such as in the browser address bar or other location, or in the view of another type of application. The security application or another component can use a device notification area, display a popup in front of the browser application display, or can use a display overlay to provide the visual indicator. The visual indicator can include text or one or more icons, can be a color (e.g., as in when a display overlay could be used to display the indicator such as when alternating diagonal yellow and black stripes). The visual indicator can be partially transparent. The visual indicator can include other text, icons, and graphical visual indications from those described herein. The security application or the other component of a computing device rendering the visual indicator can include a component, plugin or extension in a browser, and/or another type of part of a computing device.

At block 202, a security application running on a computing device identifies a domain name in a communication received by the computing device. The security application can be running on any type of computing devices such as a server, a mobile device, or a network device. In the case of a network device, the network device can be an intermediate device communicatively coupled to a mobile device and a server over a network. Also, the security application can run on multiple computing devices and perform different operations of method 200 from different computing devices that communicate over a network.

At block 204, the security application determines a popularity ranking and/or an age of the domain name.

Figure 12:
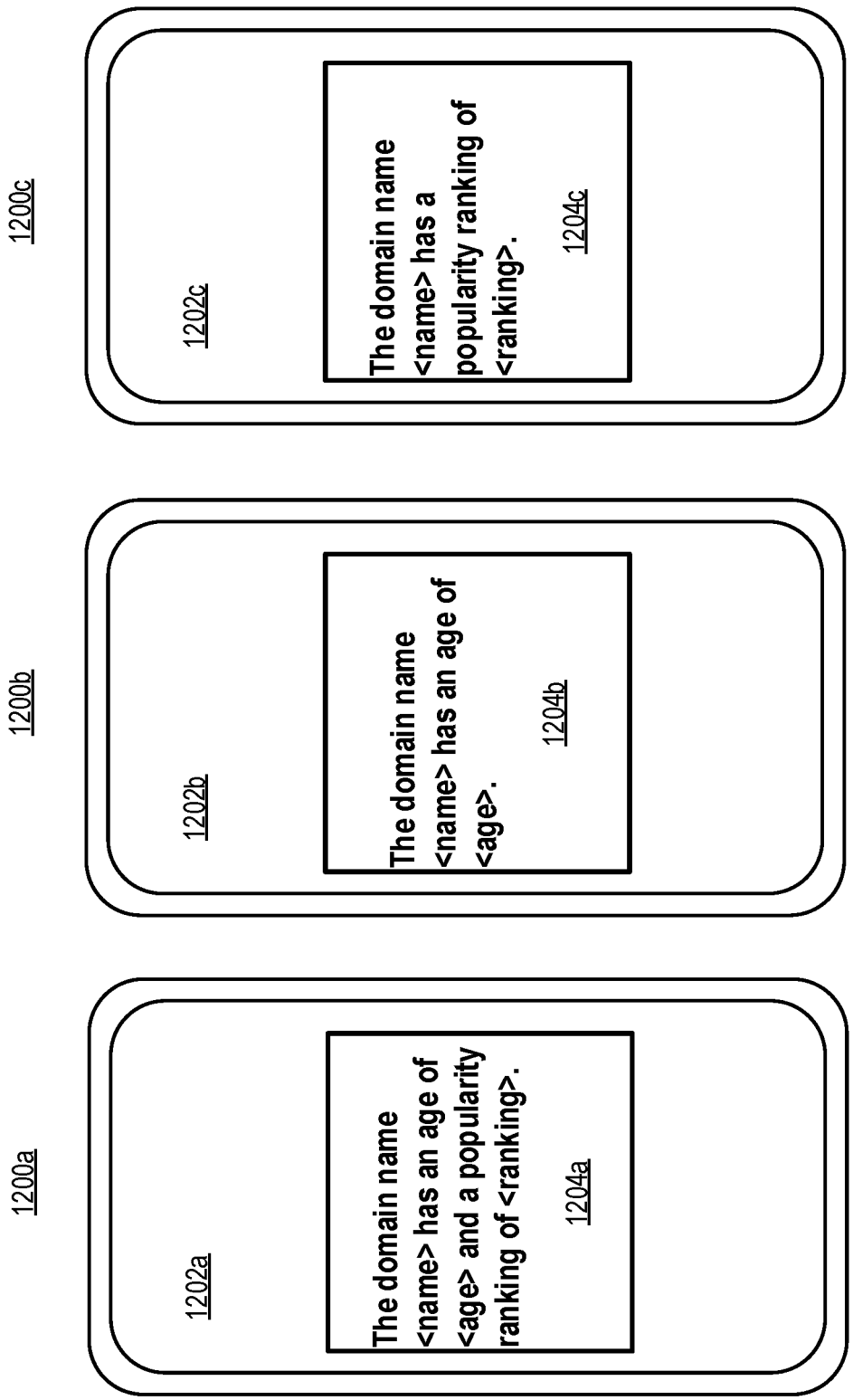
FIGS. 12A, 12B, 12C, 13, 14, and 15 show some examples of the visual indicators described herein, according to some embodiments.

At block 206, the security application renders for display on a screen of the computing device, a visual indicator having the popularity ranking and/or the age of the domain name. In the rendering, the security application communicates the visual indicator to the screen or display, and then the screen or display can display the visual indicator. Examples of the display of the visual indicator having the popularity ranking and/or the age of the domain name are shown in FIGS. 12A, 12B, and 12C. As shown in FIG. 12A, a mobile device 1200a having a touchscreen 1202a displays the visual indicator 1204a in the foreground of its display. As shown, the visual indicator 1204a includes text with a field labeled "<name>" for insertion of the domain name in the text, as well as a field labeled "<age>" for insertion of the domain name's age and a field labeled "ranking" for insertion of the domain name's popularity ranking. As shown in FIG. 12B, a mobile device 1200b having a touchscreen 1202b displays the visual indicator 1204b in the foreground of its display. As shown, the visual indicator 1204b includes text with a field labeled "<name>" for insertion of the domain name in the text, as well as a field labeled "<age>" for insertion of the domain name's age. As shown in FIG. 12C, a mobile device 1200c having a touchscreen 1202c displays the visual indicator 1204c in the foreground of its display. As shown, the visual indicator 1204c includes text with a field labeled "<name>" for insertion of the domain name in the text, as well as a field labeled "ranking" for insertion of the domain name's popularity ranking. In some embodiments, popularity of a domain can be determined by telemetry from the security application which can record instances of the domain being used or visited, thereby computing a popularity of the domain. Also, popularity of a domain can be determined using third party services, or via prior records of a domain's usage from telemetry from the security application, or by comparison of the domain to domains visited by the user or domains in the current user's bookmarks or in the bookmarks of other users on other devices.

In some embodiments, the popularity ranking can be determined using the volume of requests for a domain name resolution from a DNS server or combination or DNS servers, the amount of web traffic to a specific domain, or the amount of data sent and received by visitors to the specific domain. In some embodiments, the popularity ranking can be determined using only unique web traffic, request for domain name resolution, or sources of sent and received data. Uniqueness can be determined based one the IP address of the requester, the MAC address or the requester, and/or the pattern of requests (e.g., the content being requested). In some embodiments, the popularity ranking can be associated with a region, a company, or country. For example, if a malicious actor sets up a website and performs actions (e.g., multiple requests for domain) in Romania to artificially inflate the popularity score, this embodiment would indicate that the popularity score of the domain would be low for a user attempting to access the domain from Brazil. In some embodiments, the regional popularity score can factor in the web access request (e.g., language of cookies, language of cache content, domain requests to content in other regions,) of the specific user when determining whether which regional popularity score or combination of regional scores should apply. For example, if the Brazilian user in the last example frequently searches for content in the Romanian language then the popularity score of a Romanian website would be higher for this user than a user that never accesses Romanian web content. In some embodiments, the popularity score can be associated with an enterprise based on the access request of the enterprise users.

In some embodiments, popularity ranking can be determined using a third-party service. For example, popularity of a domain can be determined using services like the ALEXA.COM site info service (see aws.amazon.com/alexa-top-sites/). Such services can provide a cost per a certain number of URLs, such as $0.25 per 100 URLs. The security application and/or one or more computing device described herein can store or cache such information received from the services.

In some embodiments, age of a domain can be determined using a third-party service (such as by using WHOIS). Age of a domain or domain name can also be determined proactively by having consumed at a server any of several data feeds that contain information on new domain registrations or domain ownership changes. Domain ownership changes can be useful information because an attacker can leverage the reputation of a pre-existing domain that it has purchased.

In some embodiments, rankings and/or ages of domains are done on a domain name basis, and not a URL basis. In such embodiments, evaluation of a domain can be done using a DNS extension or resolution point, or in a transparent proxy. Even if there is a TLS connection, the security application can get to see the domain in the TLS handshake if positioned as a transparent proxy.

Example: a hypothetical third-party lookup on an authentic website such as www.authentic_site.com can result in a specific URL, such as: https://www.third_party_service.com/siteinfo/www.authentic_site.com?offset=1&version=3rdp_20178, which shows the service's popularity rank of the site as Rank 125.

A hypothetical third-party lookup on an inauthentic website such as www.aattentic_site.com can result in a specific URL, such as: https://www.third_party_service.com/siteinfo/www.aattentic_site.com?offset=2&version=3rdp_101111, which shows that the service has no popularity rank of the inauthentic website.

A user going to the authentic website can proceed, perhaps with no visual display of domain metadata. On the other hand, a user going to the inauthentic website, because there is no data, or if the data showed info below or above certain thresholds depending on the embodiment, can receive a visual warning through the display of the user's device, such that the warning indicates that the website is not popular or is an old website.

Another example: a hypothetical third-party lookup on an inauthentic website such as www.suthentic_site.com can result in a specific URL, such as: https://www.third_party_service.com/siteinfo/www.suthentic_site.com?offset=2&version=3rdp_22213, which shows that the service has a popularity rank of 17,995 for the inauthentic website.

A user going to the authentic website can proceed, perhaps with no visual display of domain metadata. On the other hand, a user going to the inauthentic website in the second example, because the rank is above a threshold, the user can receive a visual warning through the display of the user's device, such that the warning indicates that the website is not popular.

A problem that can occur is in the lack of complete visibility on a screen of a URL that makes it hard for even a conscientious user to be aware and cautious about clicking on a link to an inauthentic URL. Providing visibility of the inauthentic URL before a user navigates to the website of the URL can be useful in avoiding an attacker. In some embodiments, a user interacting with a URL/link displayed on a computing device screen can cause then entire URL to appear. Also, a warning before a user is allowed to proceed to the URL can be provided with a complete visual presentation of the URL. For example, when a user clicks on a link, the device can display a message to the user showing the complete URL and/or domain, and ask for permission to continue or not with navigation to the URL and/or domain.

In some embodiments, the presentation of a message to a user is not performed when the domain and/or URL has been assessed as benign. Following the link is allowed by the device without a warning to the user. In some embodiments, the presentation of a message to a user is not performed when the domain and/or URL has been assessed as phishing or potentially harmful. In such example, the link is denied be the device. Also, a presentation of the warning message with the full domain/URL can be provided to a user when the domain/URL has not been assessed sufficiently, or if it has been assessed as suspicious but not specifically confirmed as phishing or potentially harmful.

FIG. 3 shows an example method 300 for domain name and URL visual verifications including rendering a visual indicator having an entire URL entered by a user, according to some embodiments. The display of the visual indicator can occur within a web browser or another GUI of another type of application that has web browsing functionality, such as an application that has a web view component. For instance, a messaging application can display the visual indicator. Also, in some embodiments, a user can click on the URL in the indicator to visit a corresponding website.

At block 304, a security application running on a computing device identifies a URL received by the computing device in a communication received by the computing device. For example, the received URL is received from a web browser that is running on the computing device after a user has entered the URL into the web browser, at block 302. The security application can be running on any type of computing devices such as a server, a mobile device, or a network device. In the case of a network device, the network device can be an intermediate device communicatively coupled to a mobile device and a server over a network. Also, the security application can run on multiple computing devices and perform different operations of method 300 from different computing devices that communicate over a network.

Figure 13:
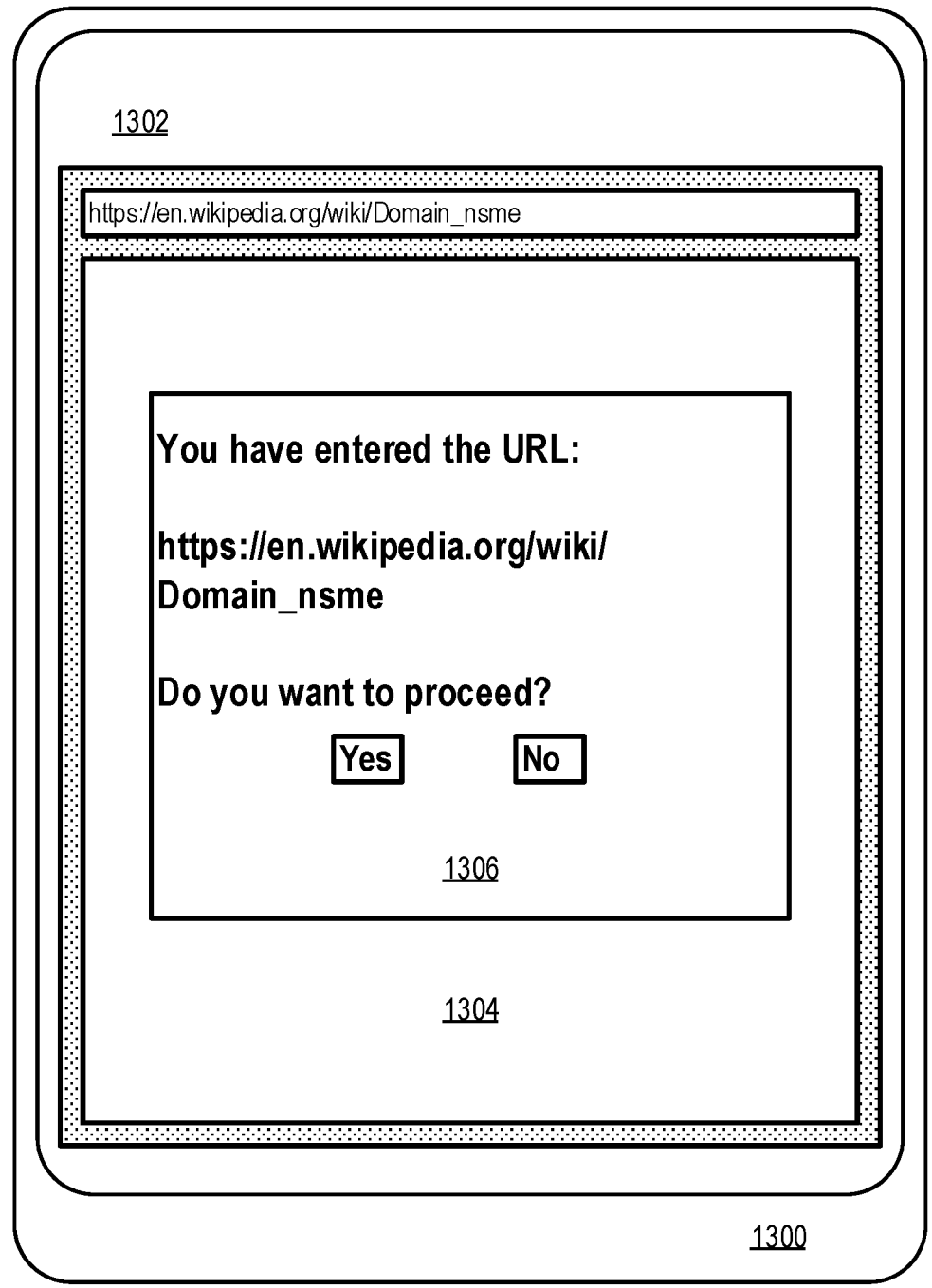

At block 306, the security application renders for display on a screen of the computing device, a visual indicator having the entire URL. In the rendering, the security application communicates the visual indicator to the screen or display, and then the screen or display can display the visual indicator. An example of the display of the visual indicator having the URL entered by the user is shown in FIG. 13. As shown in FIG. 13, mobile device 1300 having a touchscreen 1302 displays the visual indicator 1306 in the foreground of its display, which is overlapping a display of a web browser 1304 displayed in the background. As shown, the visual indicator 1306 includes text including the entire URL entered by a user in the display of the web browser 1304. In the example, the display of the entire URL in the visual indicator 1306 shows an error in the entering of the URL more prominently than the error appears in the navigation bar of the browser 1304. This way the user can be more likely to notice the entering of "Domain_nsme" when entering the URL. Also, as shown, the visual indicator 1306 provides an option for the user to proceed with navigating to the website at the URL or canceling the navigation. The additional features add extra layers of security and can prevent a user from accidently navigating to a phishing website that has a URL very similar to a URL of an authentic website.

FIGS. 4-7 show example methods for domain name and URL visual verifications, each method including rendering a visual indicator indicating a domain name is to be further evaluated along with text describing the domain name, according to some embodiments.

At block 402 in methods 400, 500, 600, and 700, a security application running on a computing device identifies a domain name in or resolved from a communication received by a computing device. In some embodiments, the security application can operate in or provide a DNS resolver. In such embodiments, a user interface of the computing device can receive a URL from a user, and then the security application (or a separate DNS resolver) can resolve the domain name based on the URL.

In some embodiments, the security application can operate in or provide a transparent proxy that can identify the domain name or resolve it from a communication received by a computing device.

The security application can be running on any type of computing devices such as a server, a mobile device, or a network device. In the case of a network device, the network device can be an intermediate device communicatively coupled to a mobile device and a server over a network. Also, the security application can run on multiple computing devices and perform different operations of methods 400, 500, 600, 700, 800, and 900 from different computing devices that communicate over a network.

Figure 4:
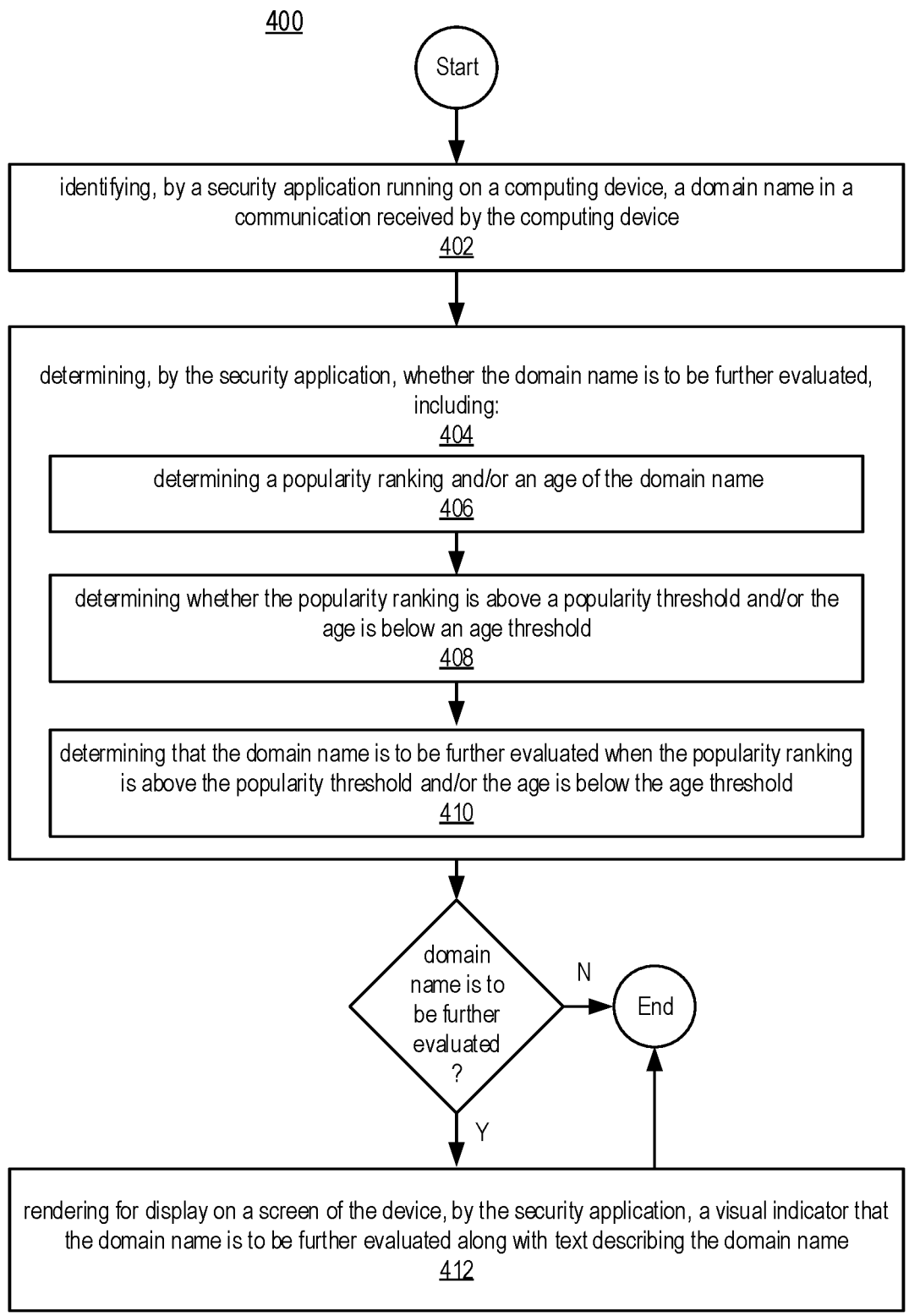
FIGS. 4-7 show example methods for domain name and URL visual verifications, each method including rendering a visual indicator indicating a domain name is to be further evaluated along with text describing the domain name, according to some embodiments.

As shown in FIG. 4, at block 404, the security application can determine whether the domain name is to be further evaluated. The determination at block 404 can include determining a popularity ranking and/or an age of the domain name—at block 406. The determination at block 404 can also include determining whether the popularity ranking is below a popularity threshold and/or the age is below an age threshold—at block 408. The determination at block 404 can also include determining that the domain name is to be further evaluated when the popularity ranking is below the popularity threshold and/or the age is below the age threshold—at block 410. For example, the popularity threshold can include a minimum popularity ranking threshold value such as one thousand. Thus, in such an example, if it is determined that the popularity ranking of the domain is greater than one thousand, then it can be determined that the domain name is to be further evaluated. Also, for example, the age threshold can include a minimum age threshold value such as one year. Thus, in such an example, if it is determined that the age of the domain is less than one year, then it can be determined that the domain name is to be further evaluated.

In some embodiments, the security application determines the popularity ranking of the domain name according to a set of popularity rankings of domain names and/or URLS provided by a third-party service. Also, the security application can determine the age of the domain name according to domain information including a new domain registration date of the domain name and/or a domain change of ownership date of the domain name.

At block 412, the security application renders for display on a screen of the computing device, a visual indicator that the domain name is to be further evaluated, when it is determined that the domain name is to be further evaluated at block 404. In the rendering, the security application communicates the visual indicator to the screen or display, and then the screen or display can display the visual indicator.

In some embodiments, the security application can render for display on the screen of a computing device, text describing the domain name along with the visual indicator. And, the text describing the domain name can include the domain name and the popularity ranking and/or the age.

Figure 14:
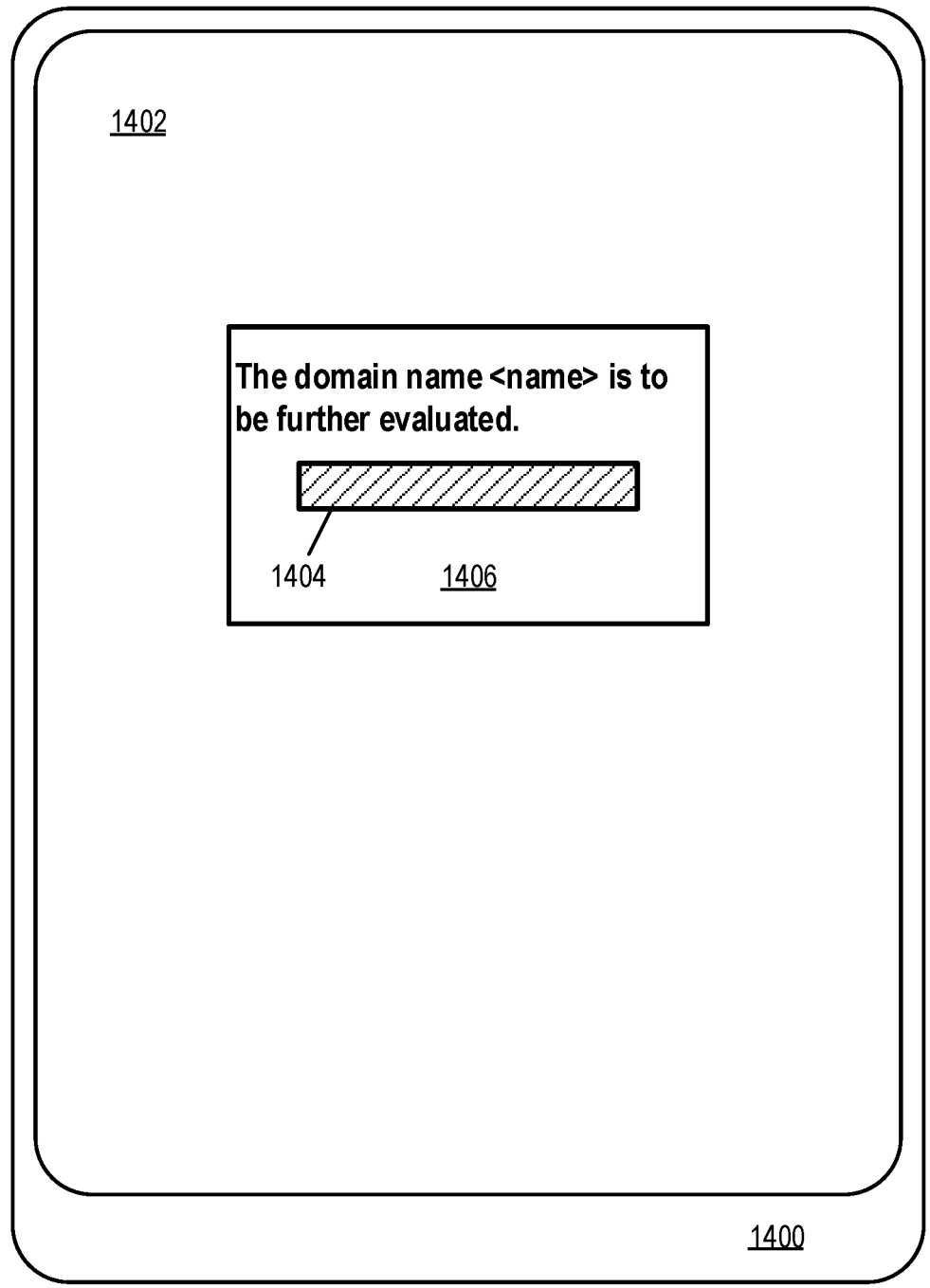

An example of the display of the visual indicator indicating the domain name is to be further evaluated is shown in FIG. 14. As shown in FIG. 14, a mobile device 1400 having a touchscreen 1402 displays the visual indicator 1406 in the foreground of its display. As shown, the visual indicator 1406 includes text with a field labeled "<name>" for insertion of the domain name in the text. Also, as shown, the visual indicator 1406 includes a graphical animation 1404 indicating that the domain name is being evaluated.

In some embodiments, the domain is identified from a URL received by the computing device. The received URL is received from a web browser that is running on the device after a user has entered the URL into the web browser. In such examples, the security application can render the entire URL for display on the screen of the mobile device. For example, see FIG. 13.

In some embodiments, the security application determines whether the domain name is to be blocked, accepted immediately, or further evaluated, and the determination of whether the domain name is to be blocked, accepted immediately, or further evaluated, can include determining whether the domain name is to be blocked according to a first list of domain names including domain names to be blocked. In such examples, the determination of whether the domain name is to be blocked, accepted immediately, or further evaluated, can also include determining whether the domain name is accepted immediately according to a second list of domain names including domain names to be accepted immediately. And, the determination can also include performing determining as to whether the domain name is to be further evaluated, if (or only if) the domain name is determined not to be blocked and not to be accepted immediately.

In some embodiments, the security application determines whether the domain name is to be blocked, accepted immediately, or further evaluated, based on criteria cached or stored in the mobile device or a network device communicatively coupled to the mobile device over a computer network. In such examples, the determination of whether the domain name is to be blocked, accepted immediately, or further evaluated, can include determining whether the domain name is listed to be blocked according to a first list cached or stored in the mobile device or in the network device. The determination can also include determining whether the domain name is listed as accepted immediately according to a second list cached or stored in the mobile device or in the network device. Also, the determination can include performing a determination as to whether the domain name is to be further evaluated, if (or only if) the domain name is determined not to be blocked and not to be accepted immediately.

Figure 5:
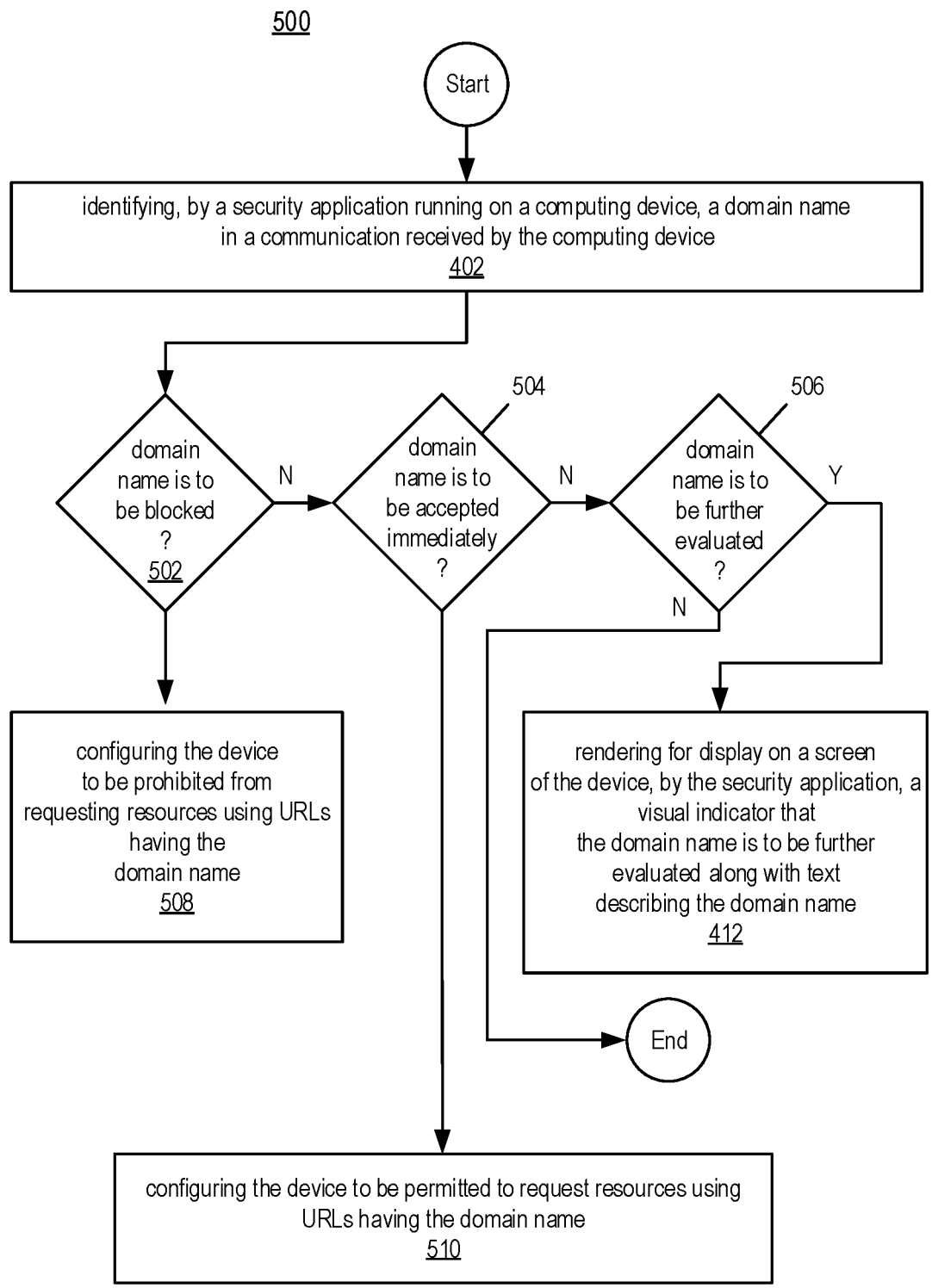

Specifically, as shown in FIG. 5, at block 502, the security application determines whether the domain name is to be blocked according to a first list of domain names including domain names to be blocked. And, at block 504, the security application determines whether the domain name is accepted immediately according to a second list of domain names including domain names to be accepted immediately. The first list can be stored, cached and or receive from a third-party by the computing device. Also, the second list can be stored, cached and or receive from a third-party by the computing device.

Then, at block 506, the security application determines whether the domain name is to be further evaluated, if the domain name is determined not to be blocked and not to be accepted immediately. In method 500, the determination at block 506, which is similar to the determination at block 404 in FIG. 4, only occurs if the domain name is determined not to be blocked, at block 502, and not to be accepted immediately, at block 504.

Also, in method 500, the determination at block 504 only occurs if the determination at block 502 determines that the domain name is not to be blocked. In some other embodiments, the determination as to whether the domain name is accepted immediately occurs before the determination that the domain name is to be blocked. In such embodiments, the blocking determination only occurs if it is determined that the domain name is not to be accepted immediately.

At block 508, the security application blocks the domain name, which includes configuring the computing device to be prohibited from requesting resources using URLs having the domain name. The configuring, at block 508, occurs when it is determined that the domain name is to be blocked, at block 502.

At block 510, the security application accepts the domain name immediately, which includes configuring the mobile device to be permitted to request resources using URLs having the domain name. The configuring, at block 510, occurs when it is determined that the domain name is to be accepted immediately, at block 504.

And, when it is determined that the domain name is to be further evaluated, at block 506, the security application renders for display on a screen of the computing device, a visual indicator that the domain name is to be further evaluated—at block 412.

Not shown, but prior to the rendering of the visual indicator at block 412, in FIG. 5, the security application can perform operation 404 depicted in FIG. 4 to determine if the visual indicator is to even occur. For example, the evaluation can include determining a popularity ranking and/or an age of the domain name—such as at block 406. The determination at block 404 can also include determining whether the popularity ranking is below a popularity threshold and/or the age is below an age threshold—at block 408. The determination at block 404 can also include determining that the domain name is to be further evaluated when the popularity ranking is below the popularity threshold and/or the age is below the age threshold—at block 410. For example, the popularity threshold can include a minimum popularity ranking threshold value such as one thousand. Thus, in such an example, if it is determined that the popularity ranking of the domain is greater than one thousand, then it can be determined that the domain name is to be further evaluated. Also, for example, the age threshold can include a minimum age threshold value such as one year. Thus, in such an example, if it is determined that the age of the domain is less than one year, then it can be determined that the domain name is to be further evaluated.

At block 412 in FIG. 5, the security application renders for display on a screen of the computing device, a visual indicator that the domain name is to be further evaluated, when it is determined that the domain name is to be further evaluated at block 506—which can include similar operations to those in block 412 of FIG. 4.

In some embodiments, the domain can be compared to domains in the user's and/or device's browsing history; and absence of a match is a sign of a possible phishing attempt.

In some embodiments, the security application can determine whether the domain name matches at least part of a URL included in a web browsing history stored or cached in a computing device. And, if (or only if) the domain name is determined not to match at least part of a URL included in the web browsing history, the security application can weight and perform determining as to whether the domain name is to be further evaluated.

Figure 6:
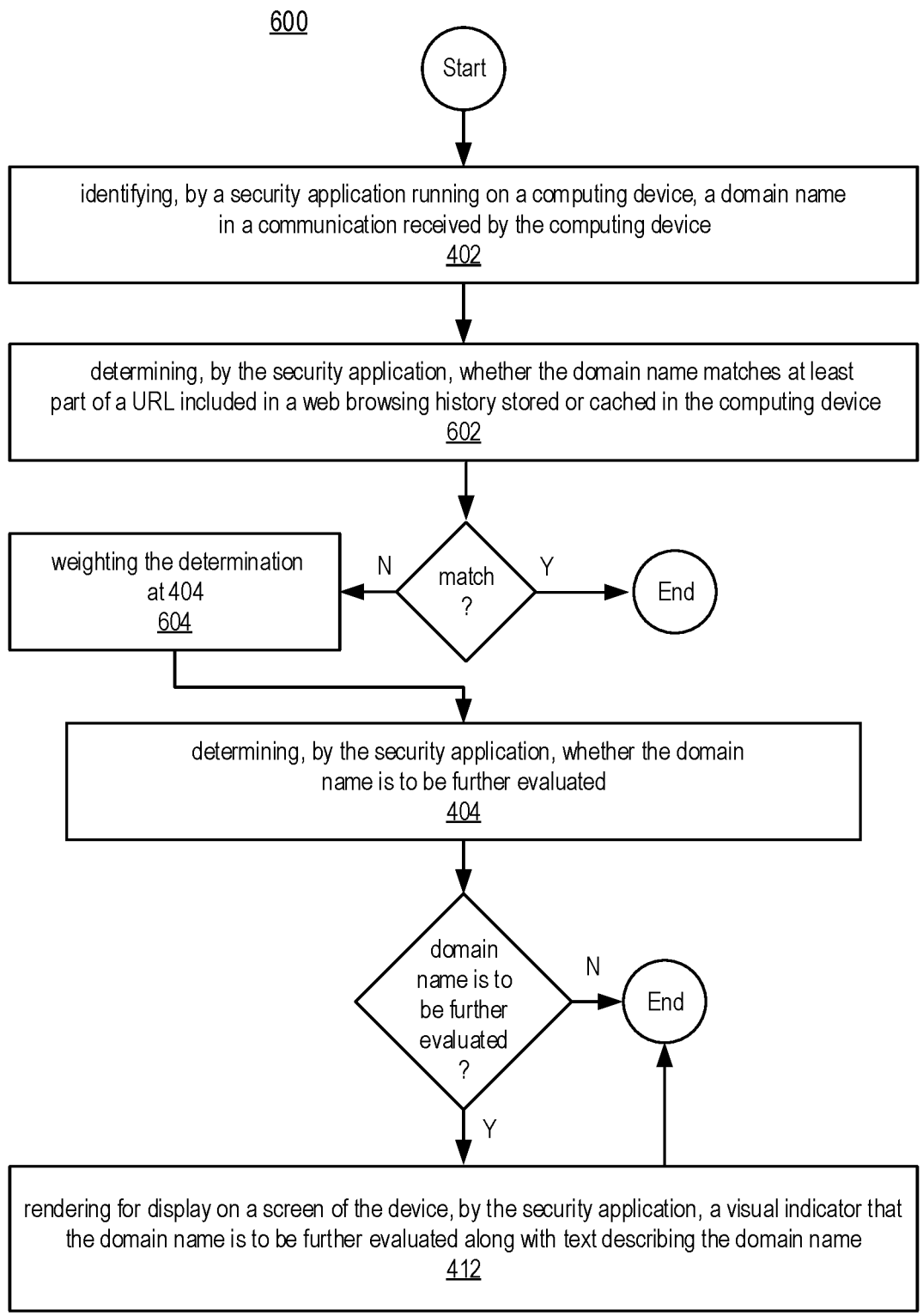

Specifically, as shown in FIG. 6, first the operation at block 402 is performed, and then before block 404 is performed, the security application determines whether the domain name matches at least part of a URL included in a web browsing history stored or cached in the computing device—at block 602. If (or only if) the domain name is determined not to match at least part of a URL included in the web browsing history, the security application performs determining as to whether the domain name is to be further evaluated—at block 404. As shown in FIG. 4, the determination at block 404 can include determining a popularity ranking and/or an age of the domain name—at block 406. The determination at block 404 can also include determining whether the popularity ranking is below a popularity threshold and/or the age is below an age threshold—at block 408. The determination at block 404 can also include determining that the domain name is to be further evaluated when the popularity ranking is below the popularity threshold and/or the age is below the age threshold—at block 410. Finally, as shown in block 412 of FIGS. 4 and 6, the security application renders for display on a screen of the computing device, a visual indicator that the domain name is to be further evaluated, when it is determined that the domain name is to be further evaluated at block 404.

In some embodiments, if (or only if) the domain name is determined not to match at least part of a URL included in a web browsing history stored or cached in the computing device, the security application can weight the determination of whether the domain name is to be further evaluated and the perform the evaluation as a weighted evaluation. As shown in FIG. 6, if there is not a match between the domain name and the at least part of a URL included in a web browsing history stored or cached in the computing device, the determination at block 404 is first weighted—at block 604. The weighting of such a determination can include weighting any one of the popularity threshold, the age threshold, the popularity ranking, or the age according to a respective configurable weight.

In some embodiments, the security application can determine whether the domain name is almost similar to an accepted domain name in that its similarity to the accepted domain name exceeds a configurable similarity threshold. The similarity can be determined as a score. The similarity of a domain to an authentic domain can be an indicator of possible deception. And, if (or only if) the domain name is determined as almost similar to an accepted domain name, the security application can weight and perform determining as to whether the domain name is to be further evaluated. Similarity between the domain name and the accepted domain name (or a URL and an accepted URL) can be determined as a similarity score according to a similarity function such as edit distance (e.g., Levenshtein distance, or Hamming distance, or Jaro-Winkler distance or other metrics used for similarity of two strings), cluster analysis and/or a function using Euclidean distance, squared Euclidean distance, or a Gaussian function.

Figure 7:
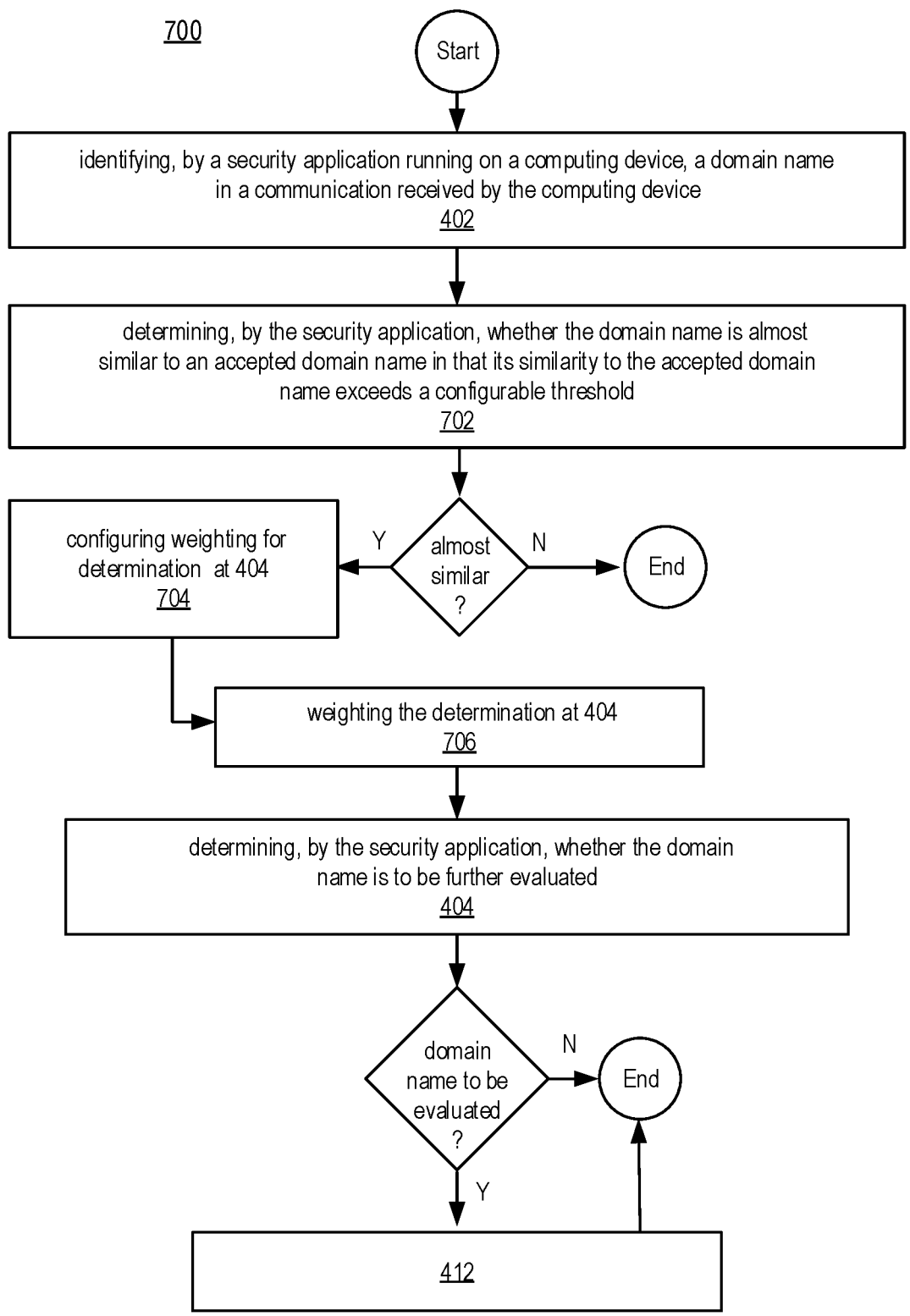

Specifically, as shown in FIG. 7, first the operation at block 402 is performed, and then before block 404 is performed, the security application determines whether the domain name is almost similar to an accepted domain name in that its similarity score with respect to the accepted domain name exceeds a configurable threshold—at block 702. If (or only if) the domain name is determined as almost similar to an accepted domain name in that its similarity score with respect to the accepted domain name exceeds a configurable threshold, the security application performs determining as to whether the domain name is to be further evaluated—at block 404. As shown in FIG. 4, the determination at block 404 can include determining a popularity ranking and/or an age of the domain name—at block 406. The determination at block 404 can also include determining whether the popularity ranking is below a popularity threshold and/or the age is below an age threshold—at block 408. The determination at block 404 can also include determining that the domain name is to be further evaluated when the popularity ranking is below the popularity threshold and/or the age is below the age threshold—at block 410. Finally, as shown in block 412 of FIGS. 4 and 7, the security application renders for display on a screen of the computing device, a visual indicator that the domain name is to be further evaluated, when it is determined that the domain name is to be further evaluated at block 404. In some embodiments, a textual analysis is performed on the entered URL to determine whether a potential spelling mistake occurred. If it is determined that a potential spelling mistake occurred, then determining the potentially correctly spelled domain and determining the popularity of the correctly spelled domain name. Also, the popularity rank of the entered URL can be compared to the popularity rank of the potentially correctly spelled domain. The result of the comparison can be a factor in determining whether to block the domain, or to display the visual indicator to the user. For example, if the entered URL is determined to have a higher popularity rating than the potentially correct domain then it can be determined that the entered URL is likely a legitimate domain.

In some embodiments, if (or only if) the domain name is determined as almost similar to an accepted domain name in that its similarity score with respect to the accepted domain name exceeds a configurable threshold, the security application can weight the determination of whether the domain name is to be further evaluated and the perform the evaluation as a weighted evaluation. As shown in FIG. 7, if the domain name is determined as almost similar to an accepted domain name, the determination at block 404 is first weighted—at block 706. The weighting of such a determination can include weighting any one of the age threshold, the popularity threshold, the popularity ranking, or the age according to a respective configurable weight. The configurable weight can be configured before the weighting at block 706—at block 704.

In some embodiments, the configuring of the configurable weight (such as at block 704) can be according to the similarity determined between the domain name and the accepted domain name (such as at block 702). Similarity between the domain name and the accepted domain name (or a URL and an accepted URL) can be determined according to a similarity function such as cluster analysis and/or a function using Euclidean distance, squared Euclidean distance, or a Gaussian function.

Figure 8:
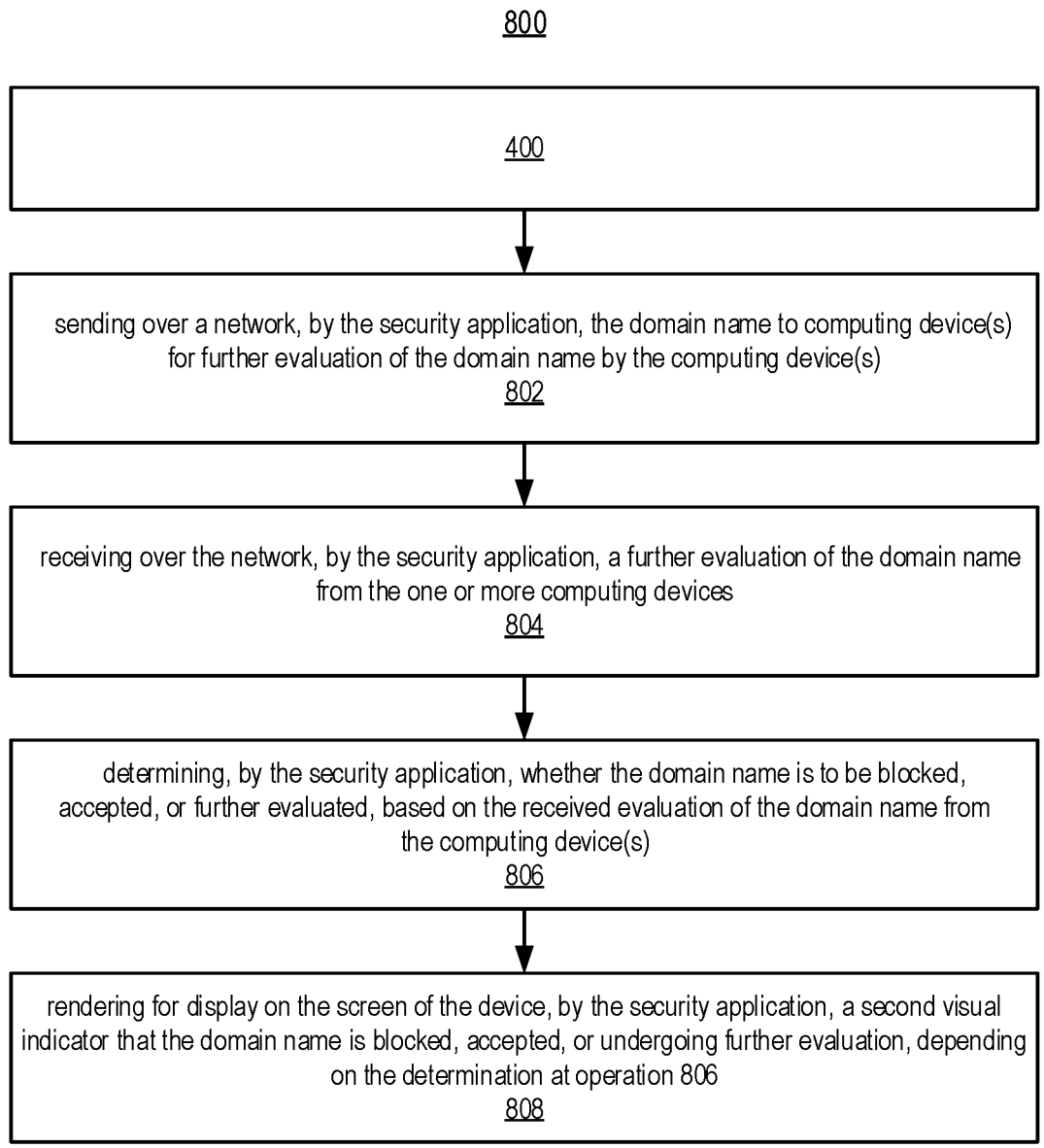
FIG. 8 shows an example method 800 for domain name and URL visual verifications including rendering a first visual indicator indicating a domain name is to be further evaluated along with text describing the domain name, and then rendering a second visual indicator indicating the domain name is blocked, accepted, or undergoing further evaluation, after the rendering of the first visual indicator, according to some embodiments.

FIG. 8 shows an example method 800 for domain name and URL visual verifications including rendering a first visual indicator indicating a domain name is to be further evaluated along with text describing the domain name, and then rendering a second visual indicator indicating the domain name is blocked, accepted, or undergoing further evaluation, after the rendering of the first visual indicator, according to some embodiments. Also, FIG. 9 shows an example method 900 for domain name and URL visual verifications including rendering a first visual indicator having text describing the domain name, and then rendering a second visual indicator indicating the domain name is blocked, accepted, or undergoing further evaluation, after the rendering of the first visual indicator, according to some embodiments.

Figure 9:
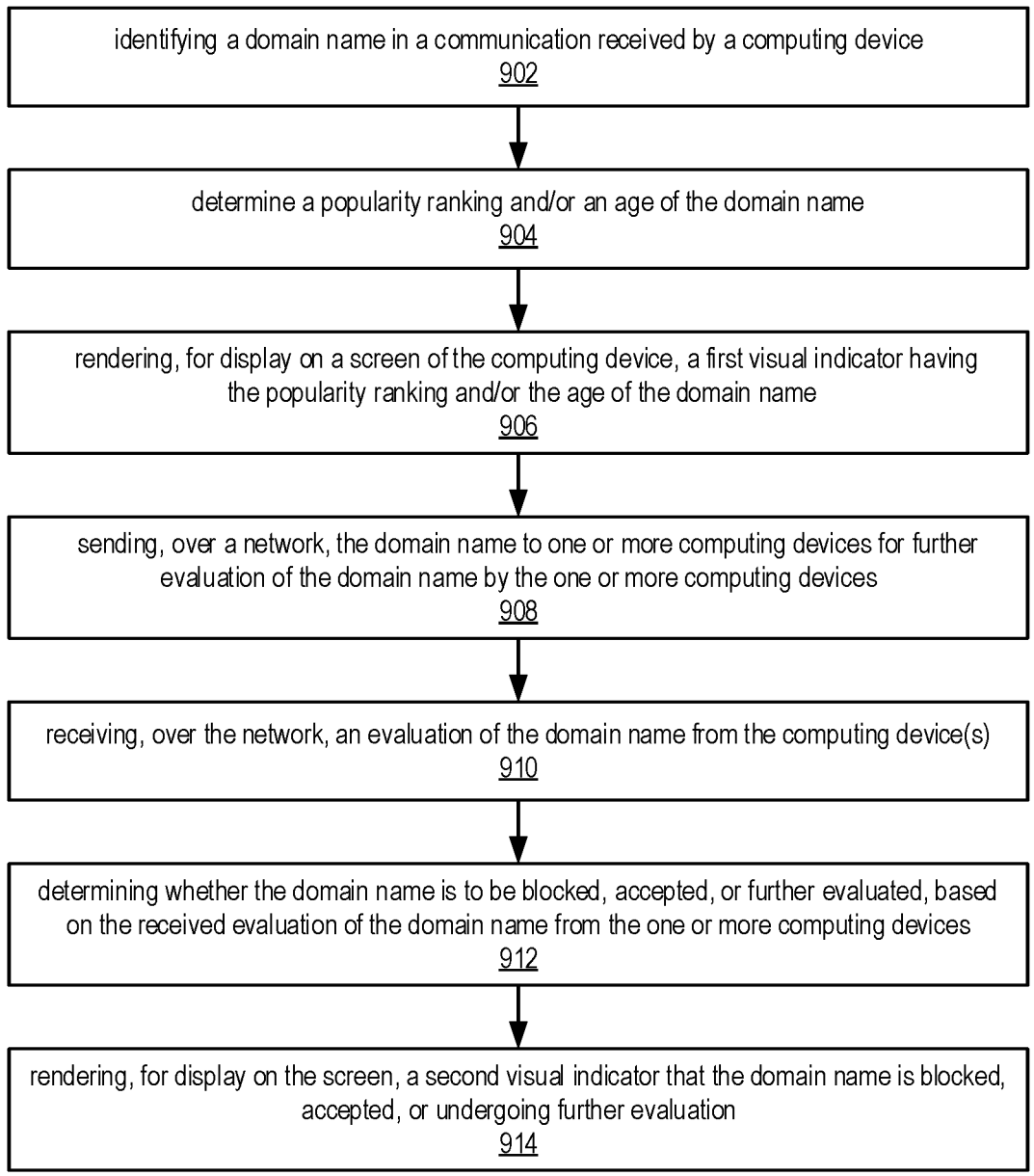
FIG. 9 shows an example method 900 for domain name and URL visual verifications including rendering a first visual indicator having text describing the domain name, and then rendering a second visual indicator indicating the domain name is blocked, accepted, or undergoing further evaluation, after the rendering of the first visual indicator, according to some embodiments.

As shown in FIGS. 8 and 9, the domain name is sent to one or more computing devices for further evaluation of the domain name by the one or more computing devices. The one or more computing devices can include a non-transitory computer readable medium having instructions which when executed by a processor on a data processing system can cause the processor and/or the system to perform any one of the operations. Also, the one or more computing devices can include security server 150 and/or the computing device 1001 illustrated in FIG. 10. Also, the one or more computing devices can include one or more of the user terminals or mobile devices illustrated in FIG. 1 and/or the computing device 1101 illustrated in FIG. 11. Also, in general, the operations and evaluations performed by the one or more computing devices can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

Specifically, as shown in FIG. 8, at block 802, subsequent to the operations of method 400 depicted in FIG. 4, the security application sends, over a network, the domain name to one or more computing devices for further evaluation of the domain name by the one or more computing devices. At block 804, the security application receives, over the network, a further evaluation of the domain name from the one or more computing devices. The further evaluation can include a similarity of the evaluated domain to an authentic domain, which can be an indicator of possible deception. Similarity between the domain name and the authentic domain name (or a URL and an authentic URL) can be determined according to a similarity function such as edit distance (e.g., Levenshtein distance, or Hamming distance, or Jaro-Winkler distance or other metrics used for similarity of two strings), cluster analysis and/or a function using Euclidean distance, squared Euclidean distance, or a Gaussian function.

At block 806, the security application determines whether the domain name is to be blocked, accepted, or further evaluated, based on the received further evaluation of the domain name from the one or more computing devices.

Figure 15:
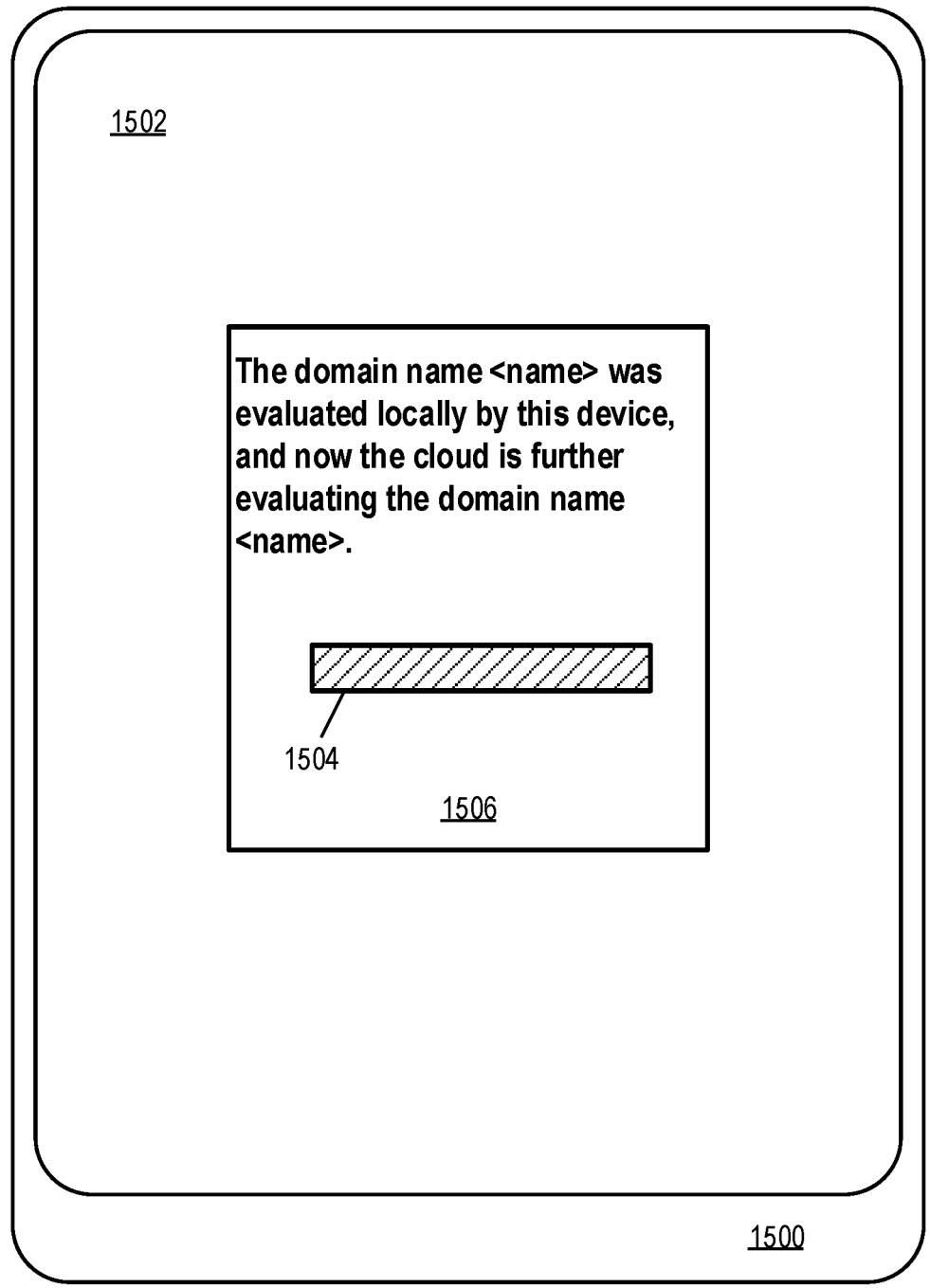

Then, at block 808, the security application renders for display on the screen of the computing device, a second visual indicator that the domain name is blocked, accepted, or undergoing further evaluation. An example of the display of the second visual indicator indicating the domain name is being further evaluated by the one or more computing devices is shown in FIG. 15. As shown in FIG. 15, a mobile device 1500 having a touchscreen 1502 displays the second visual indicator 1506 in the foreground of its display. As shown, the visual indicator 1506 includes text with a field labeled "<name>" for insertion of the domain name in the text. Also, as shown, the visual indicator 1506 includes a graphical animation 1504 indicating that the domain name is being further evaluated by the one or more computing devices. In the case of FIG. 15, the one or more computing device performing the further evaluation of the domain exist in a cloud computing system.

Specifically, as shown in FIG. 9, at block 902, a security application identifies a domain name in a communication received by a computing device (such as a mobile device). At block 904, the security application determines a popularity ranking and/or an age of the domain name. At block 906, the security application renders, for display on a screen of the computing device, a first visual indicator having the popularity ranking and/or the age of the domain name. At block 908, the security application sends, over a network, the domain name to one or more computing devices for further evaluation of the domain name by the one or more computing devices. At block 910, the security application receives, over the network, a further evaluation of the domain name from the one or more computing devices. At block 912, the security application determines whether the domain name is to be blocked, accepted, or further evaluated, based on the received further evaluation of the domain name from the one or more computing devices. At block 914, the security application renders, for display on the screen, a second visual indicator that the domain name is blocked, accepted, or undergoing further evaluation. An example of the display of the second visual indicator indicating the domain name is being further evaluated by the one or more computing devices is shown in FIG. 15.

Figure 10:
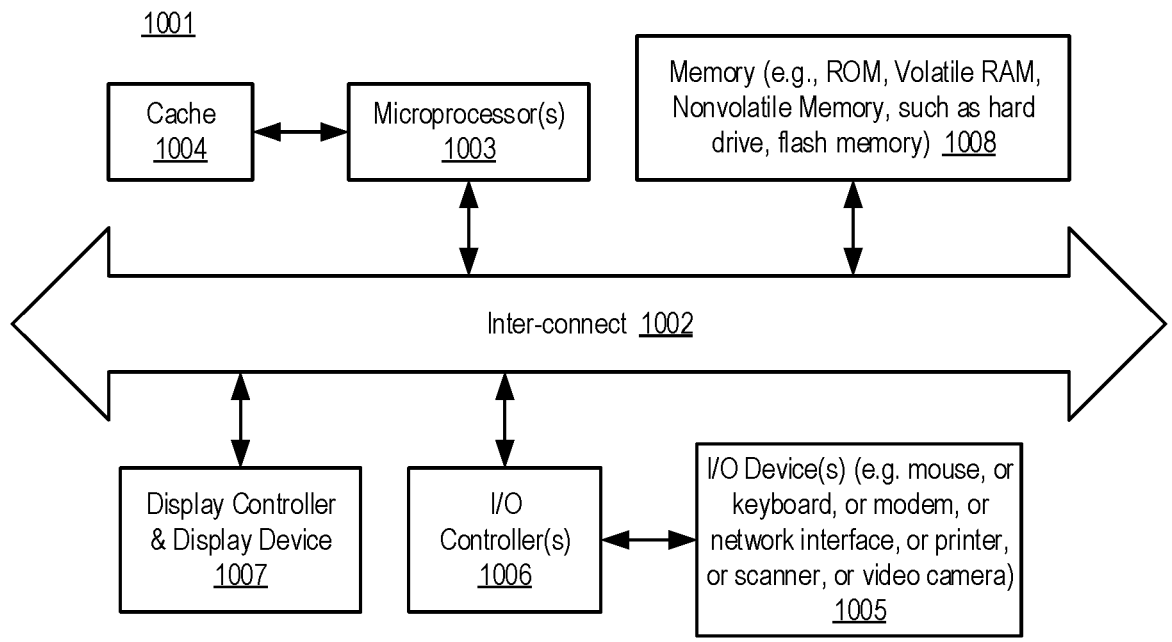
FIG. 10 shows a block diagram of a computing device (e.g., any one of the servers described herein), according to some embodiments.

FIG. 10 shows a block diagram of a computing device 1001 (e.g., any one of the servers described herein), according to some embodiments. While FIG. 10 illustrates various components, it is not intended to represent any particular architecture or manner of interconnecting the components. Other systems that have fewer or more components can also be used. In an embodiment, any one of the servers of FIG. 1 can each reside on separate computing systems, or one or more can run on the same computing device, such as computing device 1001, in various combinations.

In FIG. 10, computing device 1001 includes an inter-connect 1002 (e.g., bus and system core logic), which interconnects microprocessor(s) 1003 and memory 1008. The microprocessor(s) 1003 are coupled to cache memory 1004.

The inter-connect 1002 interconnects the microprocessor(s) 1003 and the memory 1008 together and also interconnects them to a display controller and display device 1007 and to peripheral devices such as input/output (I/O) devices 1005 through input/output controller(s) 1006. Typical I/O devices include mice, keyboards, modems, network interfaces, printers, scanners, video cameras and other devices which are well known in the art.

The inter-connect 1002 can include one or more buses connected to one another through various bridges, controllers and/or adapters. In some embodiments, the I/O controller(s) 1006 include a USB (Universal Serial Bus) adapter for controlling USB peripherals, and/or an IEEE-1394 bus adapter for controlling IEEE-1394 peripherals.

The memory 1008 can include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory can also be random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In some embodiments, a computing device as illustrated in FIG. 10 is used to implement the servers illustrated in FIG. 1 and/or other servers described herein.

In another embodiment, a computing device as illustrated in FIG. 10 is used to implement a user terminal or a mobile device such as anyone of the end user devices described herein. A user terminal can be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device such as the computing device 1001.

Embodiments of the disclosure can be implemented via the microprocessor(s) 1003 and/or the memory 1008. For example, the functionalities described can be partially implemented via hardware logic in the microprocessor(s) 1003 and partially using the instructions stored in the memory 1008. Some embodiments are implemented using the microprocessor(s) 1003 without additional instructions stored in the memory 1008. Some embodiments are implemented using the instructions stored in the memory 1008 for execution by one or more general purpose microprocessor(s) 1003. Thus, the disclosure is not limited to a specific configuration of hardware and/or software.

Figure 11:
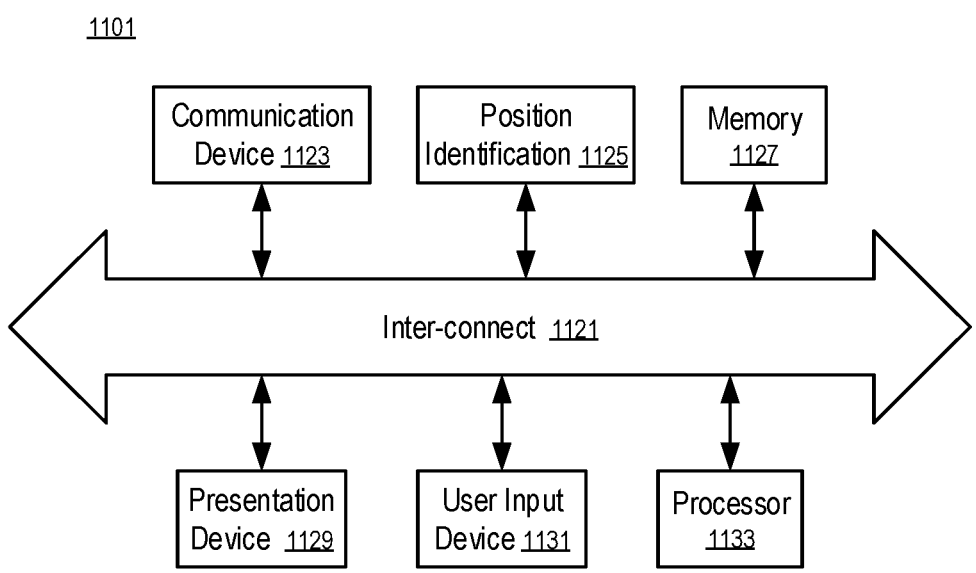
FIG. 11 shows a block diagram of a computing device (e.g., a mobile device of a user or a user terminal), according to some embodiments.

FIG. 11 shows a block diagram of a computing device (e.g., a mobile device of a user or a user terminal—such as the user terminals and mobile devices depicted in FIG. 1), according to some embodiments. In FIG. 11, the computing device 1101 includes an inter-connect 1121 connecting the presentation device 1129 (such as a display screen), user input device 1131, a processor 1133, a memory 1127, a position identification unit 1125 and a communication device 1123.

In FIG. 11, the position identification unit 1125 is used to identify a geographic location. The position identification unit 1125 can include a satellite positioning system receiver, such as a Global Positioning System (GPS) receiver, to automatically identify the current position of the computing device.

In FIG. 11, the communication device 1123 is configured to communicate with a server to provide data, including application data (e.g., an application identifier and a source identifier for a newly-sourced application). In some embodiments, the user input device 1131 is configured to receive or generate user data or content. The user input device 1131 can include a text input device, a still image camera, a video camera, and/or a sound recorder, etc.

In this description, various functions and operations can be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques can be carried out in a computing device or other system in response to its processor, such as a microprocessor, executing sequences of instructions contained in a memory, such as ROM, volatile RAM, non-volatile memory, cache or a remote storage device.

Routines executed to implement the embodiments can be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data can be stored in various places including for example ROM, volatile RAM, non-volatile memory and/or cache. Portions of this software and/or data can be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media can store the instructions.

The instructions can also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   identifying, by a computing device, a domain name in a communication received by the computing device;
   determining a characteristic of the domain name;
   determining, based on the characteristic, whether the domain name is to be further evaluated; and
   in response to determining that the domain name is to be further evaluated, rendering for display on a screen of the computing device a visual indicator.

2. The method of claim 1, wherein the characteristic is at least one of a popularity ranking or an age.

3. The method of claim 1, wherein the characteristic represents a volume of requests associated with the domain name.

4. The method of claim 1, wherein the characteristic is a popularity ranking, and determining whether the domain name is to be further evaluated comprises determining whether the popularity ranking is below a threshold.

5. The method of claim 1, further comprising rendering for display on the screen text describing the domain name.

6. The method of claim 1, wherein determining whether the domain name is to be further evaluated comprises determining whether an age of the domain name is below a threshold.

7. The method of claim 1, wherein identifying the domain name comprises identifying the domain name from a uniform resource locator (URL) received by the computing device.

8. The method of claim 1, further comprising receiving, by a user interface of the computing device, a URL from a user entering at least part of the communication.

9. The method of claim 1, further comprising determining whether the domain name is to be blocked according to a first list of domain names.

10. The method of claim 1, further comprising based on further evaluation of the domain name, blocking the domain name by configuring the computing device to be prohibited from requesting resources using URLs comprising the domain name.

11. The method of claim 1, further comprising determining whether the domain name is to be blocked based on criteria cached or stored in the computing device.

12. The method of claim 11, further comprising blocking the domain name, the blocking comprising configuring the computing device to prohibit the computing device requesting resources using the domain name.

13. The method of claim 1, wherein determining whether the domain name is to be further evaluated comprises determining whether the domain name matches at least part of a URL included in a browsing history.

14. The method of claim 1, wherein determining whether the domain name is to be further evaluated comprises weighting a popularity ranking of the domain name according to a configurable weight.

15. The method of claim 1, wherein determining whether the domain name is to be further evaluated comprises determining whether a similarity score of the domain name with respect to an accepted domain name exceeds a configurable threshold.

16. The method of claim 15, wherein determining whether the domain name is to be further evaluated further comprises weighting a popularity ranking of the domain name according to a configurable weight configured according to the similarity score.

17. The method of claim 1, wherein the visual indicator is a first visual indicator, the method further comprising:
   sending over a network the domain name to one or more computing devices for further evaluation;
   receiving over the network a further evaluation of the domain name from the one or more computing devices;
   determining whether the domain name is to be blocked or accepted based on the received further evaluation; and
   rendering for display on the screen a second visual indicator that the domain name is blocked or accepted.

18. A non-transitory computer readable storage medium storing computer readable instructions, which when executed, cause a computing system to:
   determine a popularity ranking of a domain name;
   determine, based on the popularity ranking, to further evaluate the domain name;
   send, over a network, the domain name to one or more computing devices for further evaluation;
   in response to sending the domain name, receive, over the network, a further evaluation of the domain name; and
   determine, based on the received further evaluation, whether the domain name is to be blocked.

19. The non-transitory computer readable storage medium of claim 18, wherein the computer readable instructions further cause the computing system to render, for display on a screen of the computing system, a first visual indicator comprising the popularity ranking.

20. The non-transitory computer readable storage medium of claim 19, wherein the computer readable instructions further cause the computing system to render, for display on the screen, a second visual indicator that the domain name is undergoing further evaluation.

21. The non-transitory computer readable storage medium of claim 18, wherein the popularity ranking represents a volume of requests associated with the domain name.

22. A non-transitory computer readable storage medium storing computer readable instructions, which when executed, cause a computing system to:
- determine at least one of a popularity ranking or an age of a domain name in a received communication;
- render, for display on a screen of the computing system, a visual indicator comprising text that comprises at least one of the domain name, the age, or the popularity ranking;
- send, over a network, the domain name to one or more computing devices for further evaluation; and
- receive, over the network, a further evaluation of the domain name from the one or more computing devices.

23. The non-transitory computer readable storage medium of claim 22, wherein at least the popularity ranking of the domain name in the received communication is determined, and determining the popularity ranking is based on a set of popularity rankings of domain names or URLs received over a network from a service.

24. The non-transitory computer readable storage medium of claim 22, wherein at least the age of the domain name in the received communication is determined, and determining the age is based on domain information comprising at least one of a domain registration date, or a domain change of ownership date.

\* \* \* \* \*